(12) United States Patent
Minamisawa

(10) Patent No.: US 11,300,802 B2
(45) Date of Patent: Apr. 12, 2022

(54) OPTICAL UNIT

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 316 days.

(21) Appl. No.: 16/696,275

(22) Filed: Nov. 26, 2019

(65) Prior Publication Data

US 2020/0174271 A1 Jun. 4, 2020

(30) Foreign Application Priority Data

Nov. 30, 2018 (JP) .............................. JP2018-224949
Mar. 28, 2019 (JP) .............................. JP2019-063383

(51) Int. Cl.
*G02B 27/64* (2006.01)
*G03B 5/00* (2021.01)

(52) U.S. Cl.
CPC ............. *G02B 27/646* (2013.01); *G03B 5/00* (2013.01)

(58) Field of Classification Search
None
See application file for complete search history.

(56) References Cited

U.S. PATENT DOCUMENTS 11,184,511 B2\* 11/2021 Minamisawa ....... G02B 27/646
2020/0310152 A1\* 10/2020 Minamisawa ....... G02B 13/001
2021/0223663 A1\* 7/2021 Minamisawa ......... H04N 5/225

FOREIGN PATENT DOCUMENTS

JP 2011069915 A 4/2011
JP 2016061957 A 4/2016

\* cited by examiner

*Primary Examiner* — Derek S. Chapel
(74) *Attorney, Agent, or Firm* — Cantor Colburn LLP

(57) ABSTRACT

An optical unit may include a gimbal mechanism having a gimbal frame part supporting a movable body through a support mechanism. The gimbal frame part may have a first support part extended part and a second support part extended part, and the support mechanism includes a first support part fixed to the fixed body and supporting the first support part extended part, and a second support part fixed to the movable body and supporting the second support part extended part. The first and the second support part extended parts are respectively supported by fitting a spherical projecting surface to a spherical recessed surface. The optical unit further includes a first and a second restriction mechanisms for restricting movement in the optical axis direction between the first and the second support part extended parts and the first and the second support parts.

9 Claims, 14 Drawing Sheets

OPTICAL UNIT

CROSS REFERENCE TO RELATED APPLICATION

This application claims priority under 35 USC § 119 to Japanese Application No. 2018-224949 filed on Nov. 30, 2018 and also to Japanese Application No. 2019-063383 filed on Mar. 28, 2019, the entireties of both of which are included herein by reference.

TECHNICAL FIELD

The present invention relates to an optical unit.

BACKGROUND

Conventionally, various optical units have been used each of which includes a movable body, a fixed body, a support mechanism movably supporting the movable body with respect to the fixed body, and a gimbal mechanism having a gimbal frame part which supports the movable body between the movable body and the fixed body through the support mechanism. For example, in Japanese Patent Laid-Open No. 2016-61957 (Patent Literature 1), an optical unit is disclosed which includes a movable body, a fixed body, a gimbal mechanism having a movable frame, and a first contact spring and a second contact spring as a support mechanism.

However, in a conventional optical unit including a movable body, a fixed body, a support mechanism and a gimbal mechanism like the optical unit described in Patent Literature 1, a gimbal frame part of the gimbal mechanism may be disengaged.

SUMMARY

In view of the problem described above, the at least an embodiment of the present invention provides an optical unit capable of restraining the gimbal frame part from disengaging.

To solve the above mentioned problem, at least an embodiment of the present invention provides an optical unit including a movable body having an optical module, a fixed body, a support mechanism which movably supports the movable body with respect to the fixed body, and a gimbal mechanism having a gimbal frame part which supports the movable body through the support mechanism between the movable body and the fixed body. The gimbal frame part is provided with a first support part extended part which is extended along an optical axis direction and a second support part extended part which is extended along the optical axis direction, and the support mechanism is provided with a first support part which is fixed to the fixed body and supports the first support part extended part and a second support part which is fixed to the movable body and supports the second support part extended part. The first support part extended part is supported with respect to the first support part by fitting a spherical projecting surface to a spherical recessed surface, the second support part extended part is supported with respect to the second support part by fitting a spherical projecting surface to a spherical recessed surface. The optical unit further includes a first restriction mechanism structured to restrict movement in the optical axis direction between the first support part extended part and the first support part, and a second restriction mechanism structured to restrict movement in the optical axis direction between the second support part extended part and the second support part.

According to this embodiment, the optical unit includes a first restriction mechanism structured to restrict movement in the optical axis direction between the first support part extended part and the first support part, and a second restriction mechanism structured to restrict movement in the optical axis direction between the second support part extended part and the second support part. Therefore, the gimbal frame part can be effectively restrained from disengaging in the optical axis direction. Further, the first support part extended part is supported with respect to the first support part by fitting a spherical projecting surface to a spherical recessed surface, and the second support part extended part is supported with respect to the second support part by fitting a spherical projecting surface to a spherical recessed surface. In other words, the spherical surfaces are contacted with each other and thus, the gimbal frame part can be also restrained from disengaging in a direction other than the optical axis direction.

In the optical unit in accordance with at least an embodiment of the present invention, it is preferable that the optical unit includes two pieces of the first support part extended parts, and the two first support part extended parts respectively apply pressing forces to reverse directions along a first direction intersecting the optical axis direction, and the optical unit also includes two pieces of the second support part extended parts, and the two second support part extended parts respectively apply pressing forces to reverse directions along a second direction intersecting the optical axis direction and the first direction. The two first support part extended parts and the two second support part extended parts are respectively structured so as to press in reverse directions to each other and thus, the support point position can be restrained from shaking and the gimbal frame part can be effectively restrained from disengaging in a direction intersecting the optical axis direction.

In the optical unit in accordance with at least an embodiment of the present invention, it is preferable that the first support part extended part is formed with the spherical recessed surface and the first support part is formed with the spherical projecting surface, and the second support part extended part is formed with the spherical recessed surface and the second support part is formed with the spherical projecting surface. The first support part extended part and the second support part extended part are formed with the spherical recessed surface and the first support part and the second support part are formed with the spherical projecting surface and thus, the optical unit can be easily manufactured.

In the optical unit in accordance with at least an embodiment of the present invention, it is preferable that the first restriction mechanism includes a first protruded part which is provided in the first support part and is protruded toward the first support part extended part, and a first abutting part which is provided in the first support part extended part and permits protrusion of the first protruded part and is structured to be abutted with the first protruded part when the first support part extended part is moved with respect to the first support part along the optical axis direction. Further, the second restriction mechanism includes a second protruded part which is provided in the second support part and is protruded toward the second support part extended part, and a second abutting part which is provided in the second support part extended part and permits protrusion of the second protruded part and is structured to be abutted with the second protruded part when the second support part extended part is moved with respect to the second support part along the optical axis direction. Protruded parts are provided in the first support part and the second support part, and each of the first support part extended part and the second support part extended part is provided with an abutting part for abutting with the protruded part and thus, the optical unit can be easily manufactured.

In the optical unit in accordance with at least an embodiment of the present invention, it is preferable that the first support part is provided with a plurality of the first protruded parts so as to sandwich the first support part extended part, and the second support part is provided with a plurality of the second protruded parts so as to sandwich the second support part extended part. The first support part extended part is sandwiched by the first protruded parts and the second support part extended part is sandwiched by the second protruded parts and thus, the gimbal frame part can be sandwiched from both sides between a plurality of the protruded parts, and the gimbal frame part can be effectively restrained from disengaging in a direction intersecting the optical axis direction.

In the optical unit in accordance with at least an embodiment of the present invention, it is preferable that the first support part extended part is provided with a first hole part which permits protrusion of the first protruded part, and the second support part extended part is provided with a second hole part which permits protrusion of the second protruded part. In comparison with a structure that the first support part extended part and the second support part extended part are sandwiched from both sides by the protruded parts, the first support part extended part and the second support part extended part can be formed thinly and thus, the size of the device can be reduced.

In the optical unit in accordance with at least an embodiment of the present invention, it is preferable that the first support part is formed in an "L"-shape, and the second support part is formed in an "L"-shape. When the first support part and the second support part are formed in an "L"-shape, the first support part and the second support part serve as a restriction part in a pushing direction of the gimbal frame part and thus, the gimbal frame part can be effectively restrained from disengaging. Further, when the first support part and the second support part are formed in an "L"-shape, contact areas with the fixed body and the movable body can be increased, and fixing strengths to the fixed body and the movable body can be increased.

In the optical unit in accordance with at least an embodiment of the present invention, it is preferable that the fixed body is provided with an inserted path for the first support part, the first support part is provided with a bent part which is bent so as to have a width corresponding to a width of the inserted path for the first support part, the movable body is provided with an inserted path for the second support part, and the second support part is provided with a bent part which is bent so as to have a width corresponding to a width of the inserted path for the second support part. Positioning accuracy of the first support part with respect to the fixed body and positioning accuracy of the second support part with respect to the movable body can be enhanced.

In the optical unit in accordance with at least an embodiment of the present invention, it is preferable that one of the first support part extended part and the first support part which is provided with the spherical projecting surface is made of metal, and one of the second support part extended part and the second support part which is provided with the spherical projecting surface is made of metal. Since the part provided with the spherical projecting surface is structured of metal, the structure provided with the spherical projecting surface can be easily formed with high strength by welding.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
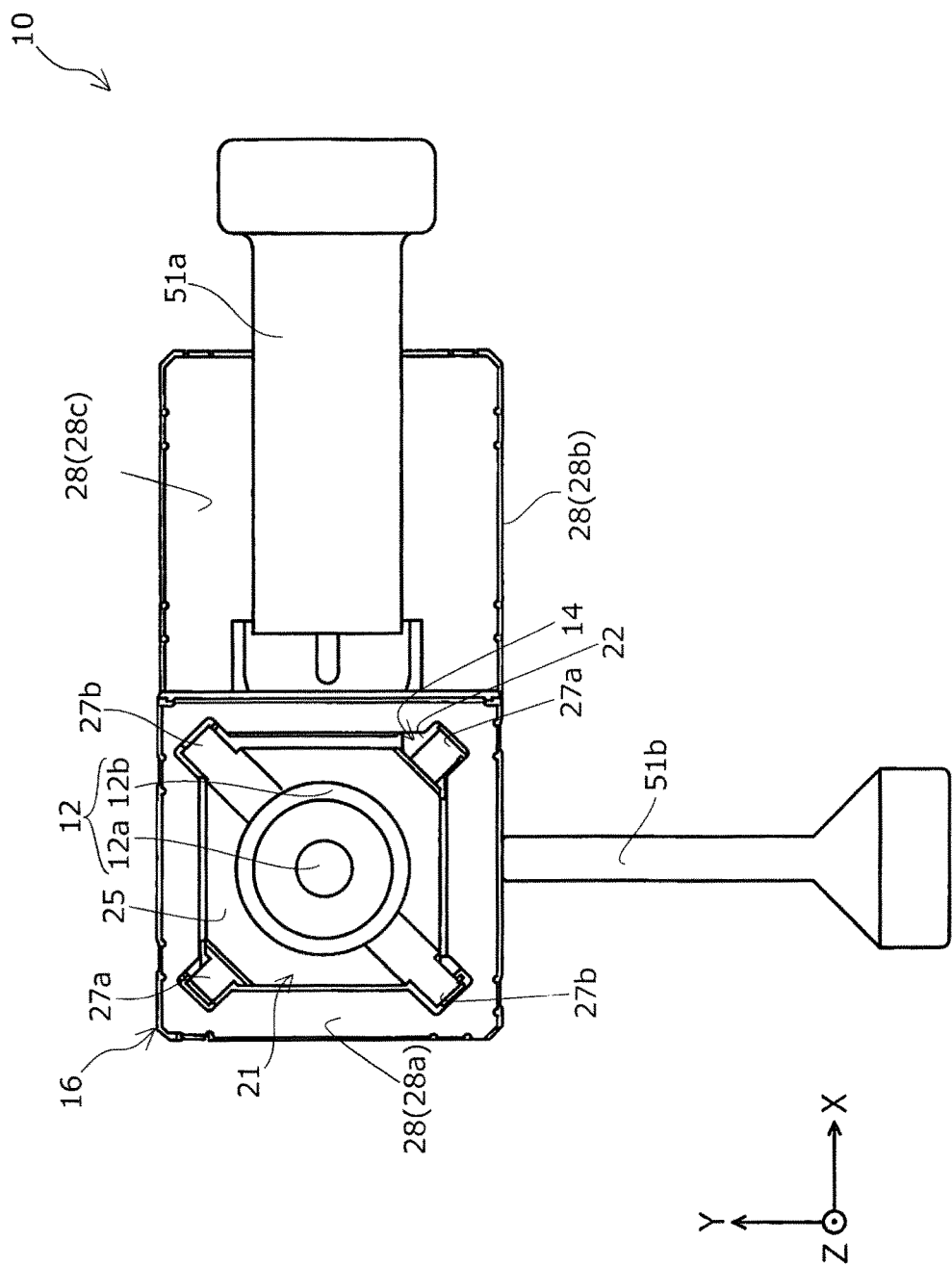
FIG. 1 is a plan view showing an optical unit in accordance with a first embodiment of the present invention.

Embodiments of the present invention will be described below with reference to the attached drawings. The same reference signs are used in the same structures in each of the embodiments, and the same structures are described only in a first embodiment and descriptions of the same structures are omitted in the subsequent embodiments.

[First Embodiment] (FIG. 1 Through FIG. 10)

First, an optical unit in accordance with a first embodiment of the present invention will be described below with reference to FIG. 1 through FIG. 10. In FIG. 2, the alternate long and short dash line with the reference sign "L" indicates an optical axis, the alternate long and short dash line with the reference sign "L1" indicates a first axial line intersecting the optical axis, and the alternate long and short dash line with the reference sign "L2" indicates a second axial line "L2" intersecting the optical axis "L" and the first axial line "L1". Further, in the respective figures, the "Z"-axis direction is an optical axis direction, the "X"-axis direction is a direction intersecting the optical axis, i.e., an axial direction of yawing, and the "Y"-axis direction is a direction intersecting the optical axis, i.e., an axial direction of pitching.

<Schematic Entire Structure of Optical Unit>

A structure of an optical unit 10 in accordance with a first embodiment of the present invention will be described below with reference to FIG. 1 through FIG. 3. The optical unit 10 includes a movable body 14 having an optical module 12, and a fixed body 16 which holds the movable body 14 in a state that the movable body 14 is capable of being displaced in a direction (pitching direction) with the "Y"-axis direction as a turning axis and in a direction (yawing direction) with the "X"-axis direction as a turning axis. Further, the optical unit 10 includes a turning drive mechanism 18 structured to drive the movable body 14 in the pitching direction and the yawing direction and support mechanisms 20 (thrust receiving member) which support the movable body 14 turnable in the pitching direction and the yawing direction with respect to the fixed body 16. In addition, the optical unit 10 includes a gimbal mechanism 21 having a gimbal frame part 25. The gimbal frame part 25 is provided with first support part extended parts 27a extended from both end parts in the first axial line "L1" along the optical axis direction and second support part extended parts 27b extended from both end parts in the second axial line "L2" along the optical axis direction.

<Optical Module>

In this embodiment, the optical module 12 is formed in a substantially rectangular case shape and, for example, the optical module 12 is used as a thin camera mounted on a cellular phone with a camera, a tablet type PC and the like. The optical module 12 includes a lens 12a on an object side and incorporates an optical device or the like structured to capture an image in an inside of a rectangular case-shaped housing 12b. The optical unit 10 in this embodiment incorporates, as an example, an actuator structured to correct a shake of pitching (shake in a turning direction with the "Y"-axis direction as a turning axis) occurred in the optical module 12 and a shake of yawing (shake in a turning direction with the "X"-axis direction as a turning axis), and the optical unit 10 is structured so as to be capable of performing a shake correction of pitching and a shake correction of yawing.

In this embodiment, the optical unit 10 is structured so as to be capable of correcting a shake of pitching and a shake of yawing. However, the present invention is not limited to this structure and, for example, a structure may be adopted that only one of a shake of pitching and a shake of yawing can be corrected.

<Imaging Element>

Figure 3:
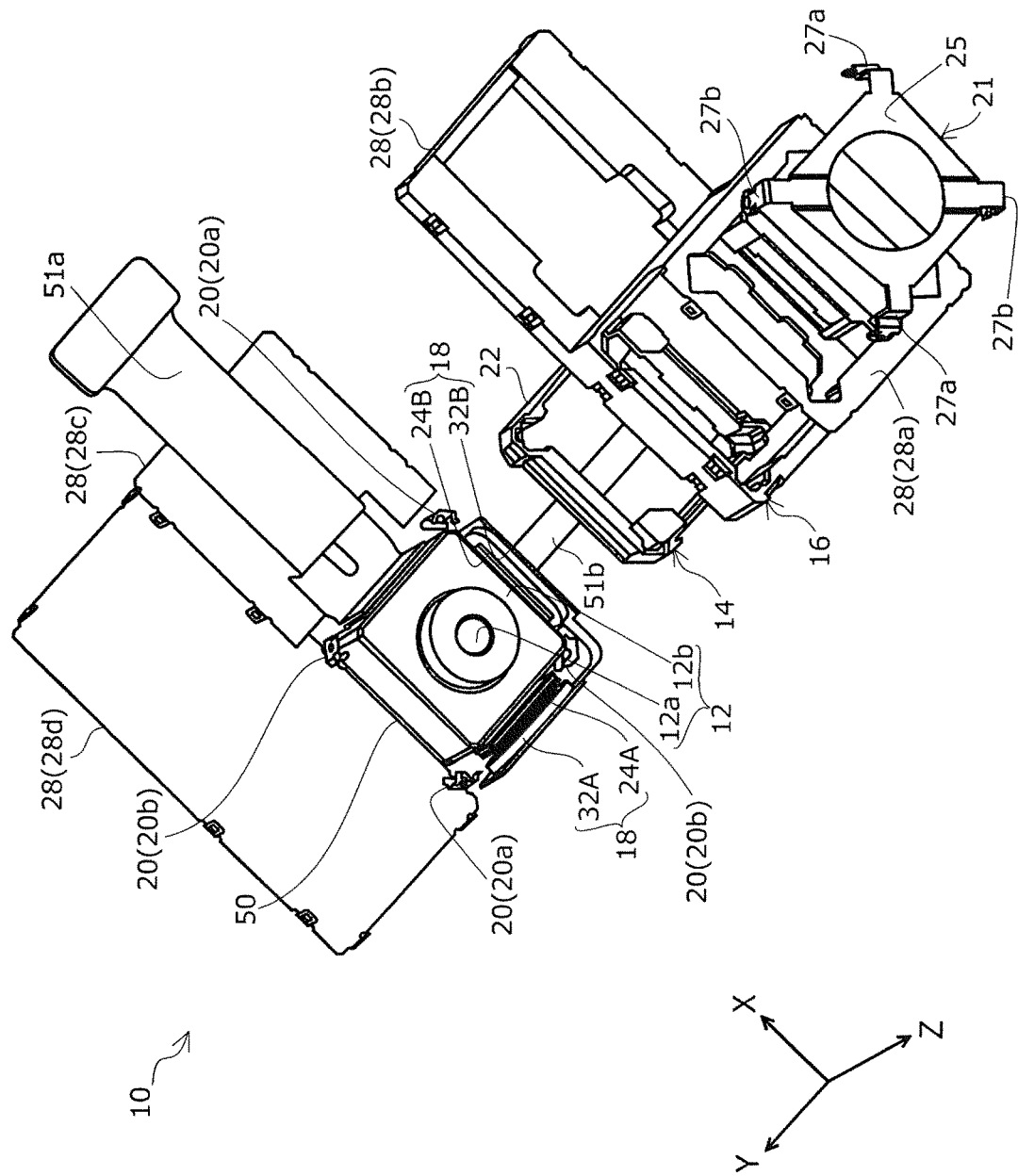
FIG. 3 is an exploded perspective view showing an optical unit in accordance with a first embodiment of the present invention.

As shown in FIG. 3, the optical module 12 includes an imaging element 50 on an opposite side to an object side. The imaging element 50 is connected with a first flexible circuit board 51a. The imaging element 50 in this embodiment is provided with a connection part not shown and the connection part is connected with the first flexible circuit board 51a.

<Movable Body>

Figure 2:
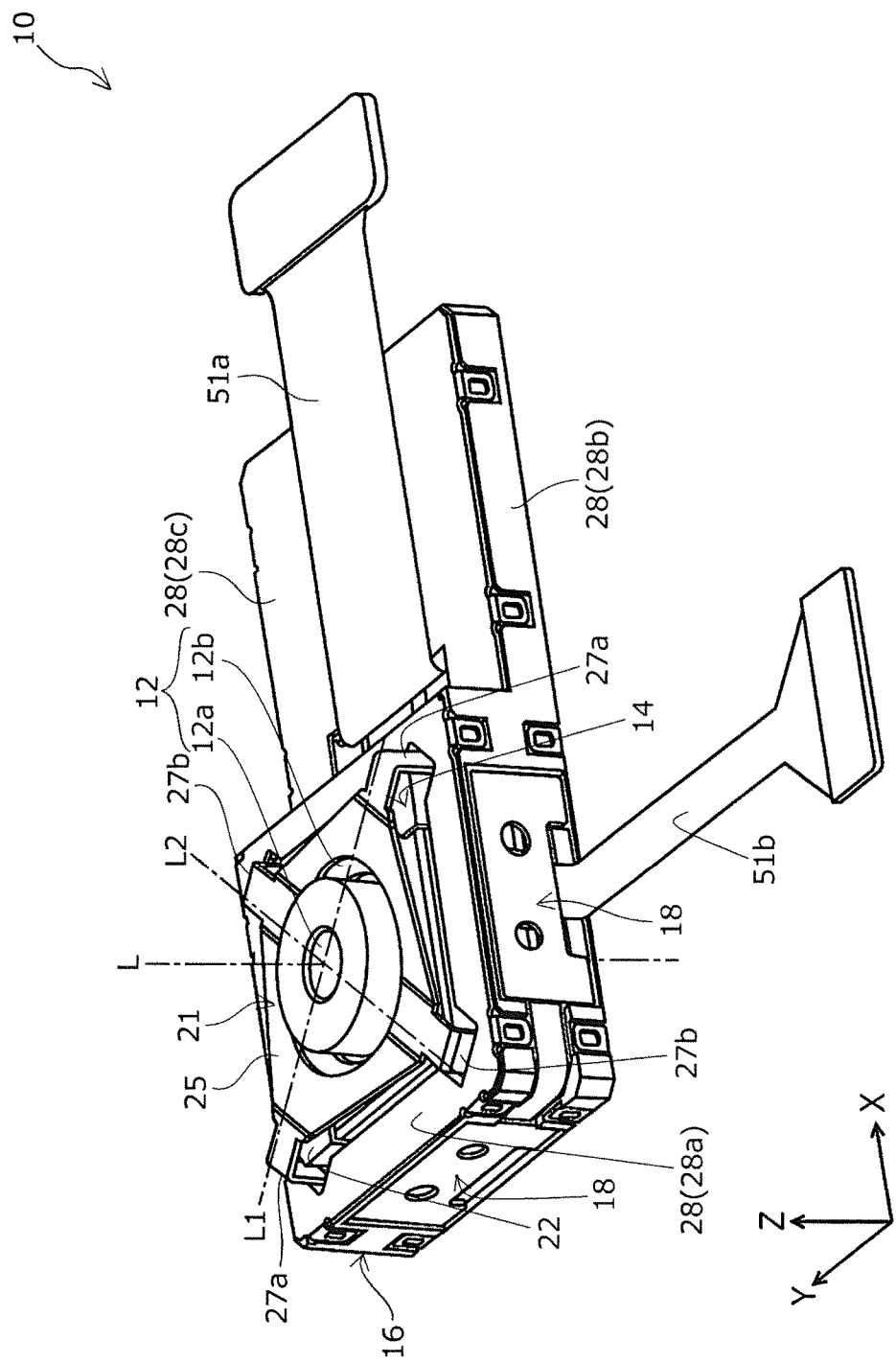
FIG. 2 is a perspective view showing an optical unit in accordance with a first embodiment of the present invention.

In FIG. 1 through FIG. 3, the movable body 14 includes the optical module 12, a holder frame 22 and magnets 24A and 24B. The holder frame 22 is structured to be a member formed in a rectangular frame shape which surrounds four side faces of the optical module 12 except its front face (face on an object side) where the lens 12a of the optical module 12 is provided and its rear face on an opposite side. The holder frame 22 in this embodiment is, as an example, structured so that the optical module 12 is detachable. The magnets 24A and 24B for correcting pitching and yawing are attached to outer faces of the holder frame 22 by utilizing two faces facing the fixed body 16. In FIG. 3, in order to easily understood the provided positions of the magnets 24A and 24B, the magnets 24A and 24B are shown in a separated state from the holder frame 22, but the magnets 24A and 24B are attached to the holder frame 22.

<Fixed Body>

In FIG. 1 through FIG. 3, the fixed body 16 includes a fixed frame 28 and coils 32A and 32B. In this embodiment, the fixed frame 28 is structured of a first front face cover part 28a surrounding the movable body 14 on the object side, a side face cover part 28b surrounding four faces of the holder frame 22, a second front face cover part 28c which is provided on the object side and on which the first flexible circuit board 51a is placed, and a rear face cover part 28d which covers an opposite side to the object side. In FIG. 3, in order to easily understood the positions of the coils 32A and 32B with respect to the magnets 24A and 24B, the coils 32A and 32B are shown in a separated state from the side face cover part 28b, but the coils 32A and 32B are attached to the side face cover part 28b.

As shown in FIG. 3, in this embodiment, the magnet 24A and the coil 32A are set in a facing state and the magnet 24B and the coil 32B are set in a facing state in a state that the movable body 14 is disposed in an inside of the fixed body 16. Further, in this embodiment, a pair of the magnet 24A and the coil 32A and a pair of the magnet 24B and the coil 32B structure a turning drive mechanism 18. Pitching and yawing of the movable body 14 are corrected by the turning drive mechanism 18. In this embodiment, the coils 32A and 32B are, as an example, structured of a winding coil, but the coils 32A and 32B may be structured of a patterned board (coil substrate) in which a coil is formed to be a wiring in a substrate as a pattern.

Corrections of pitching and yawing are performed as follows. When a shake of both or either one of a pitching direction and a yawing direction occurs in the optical unit 10, the shake is detected by a shake detection sensor (gyroscope) not shown and the turning drive mechanism 18 is driven based on the result. After that, the turning drive mechanism 18 is operated so as to correct the shake of the optical unit 10 by using a magnetic sensor (Hall element) or the like with a high degree of accuracy. In other words, an electric current is supplied to the respective coils 32A and 32B so as to move the movable body 14 in a direction canceling the shake of the optical unit 10 and thereby the shake is corrected.

The optical unit 10 in this embodiment includes the turning drive mechanism 18 structured to turn the movable body 14 with respect to the fixed body 16 with the first axial line "L1" and the second axial line "L2" as turning axes. The movable body 14 is turned around the axial direction of pitching and the axial direction of yawing by combination of the turnings around the first axial line "L1" and the second axial line "L2". The turning drive mechanism 18 is preferably disposed at a position other than a side where the first flexible circuit board 51a is disposed in the "X"-axis direction with respect to the movable body 14 like this embodiment. Since the turning drive mechanism 18 can be disposed on a side where the first flexible circuit board 51a is not formed, contact between the turning drive mechanism 18 and a second flexible circuit board 51b connected with the turning drive mechanism 18 and the first flexible circuit board Ma can be restrained. Therefore, according to this structure, the size of the optical unit 10 is not required to increase and the size of the optical unit 10 can be reduced. In the present specification, the "turning" is not required to turn 360° and includes a swing in a turning direction.

A drive source for performing a correcting operation of a shake is not limited to a voice coil motor which is structured of respective pairs of the coils 32A and 32B and the magnets 24A and 24B like the turning drive mechanism 18. A stepping motor, a piezo element or the like may be utilized as the drive source.

Next, the support mechanism 20 and the gimbal mechanism 21 which are a main part of the optical unit 10 in this embodiment will be described in detail below with reference to FIG. 4 through FIG. 10. FIG. 7 through FIG. 10 of the optical unit 10 in this embodiment and FIG. 11 through FIG. 14 of optical units 10 in a second embodiment through a fifth embodiment described below show support structures for a first support part extended part 27a by a first thrust receiving member 20a. Support structures for a second support part extended part 27b by a second thrust receiving member 20b are similarly structured.

<Gimbal Mechanism>

Figure 4:
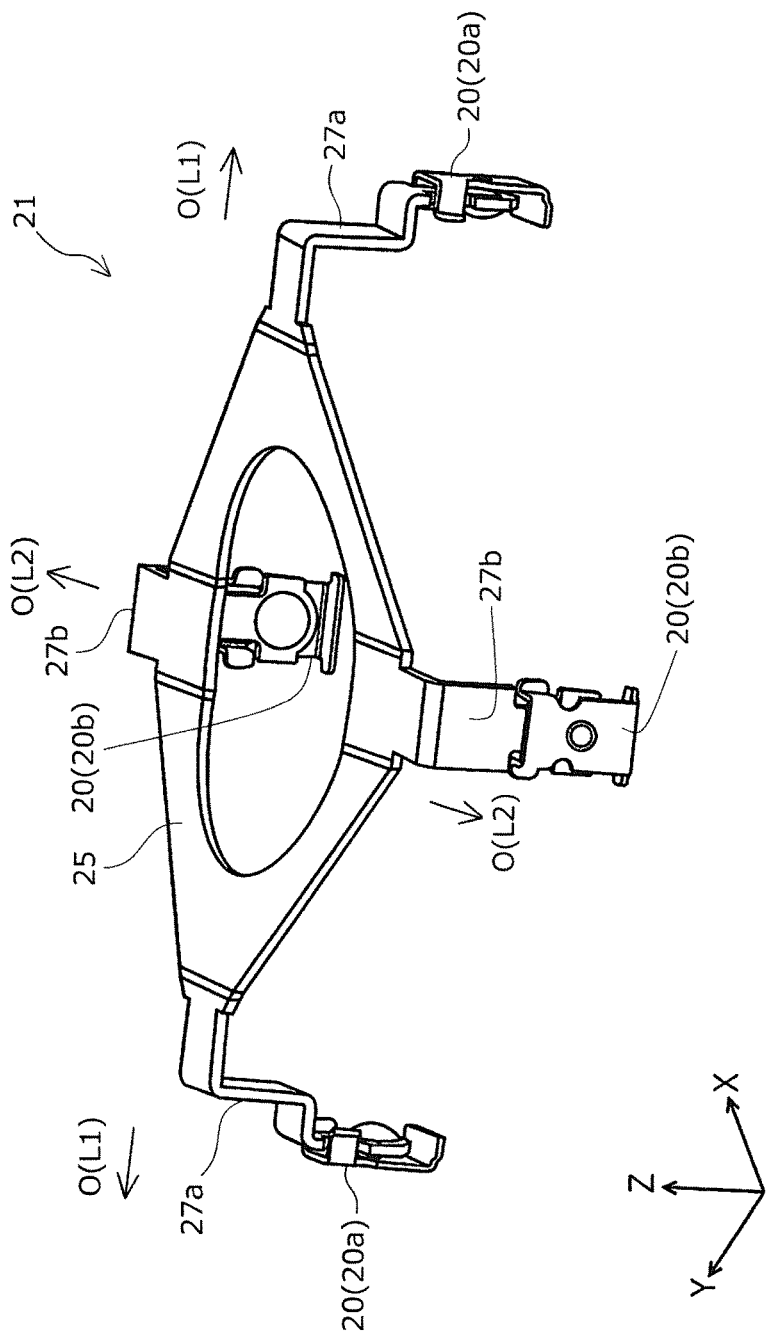
FIG. 4 is a perspective view showing a gimbal frame part and support mechanisms of an optical unit in accordance with a first embodiment of the present invention.
Figure 5:
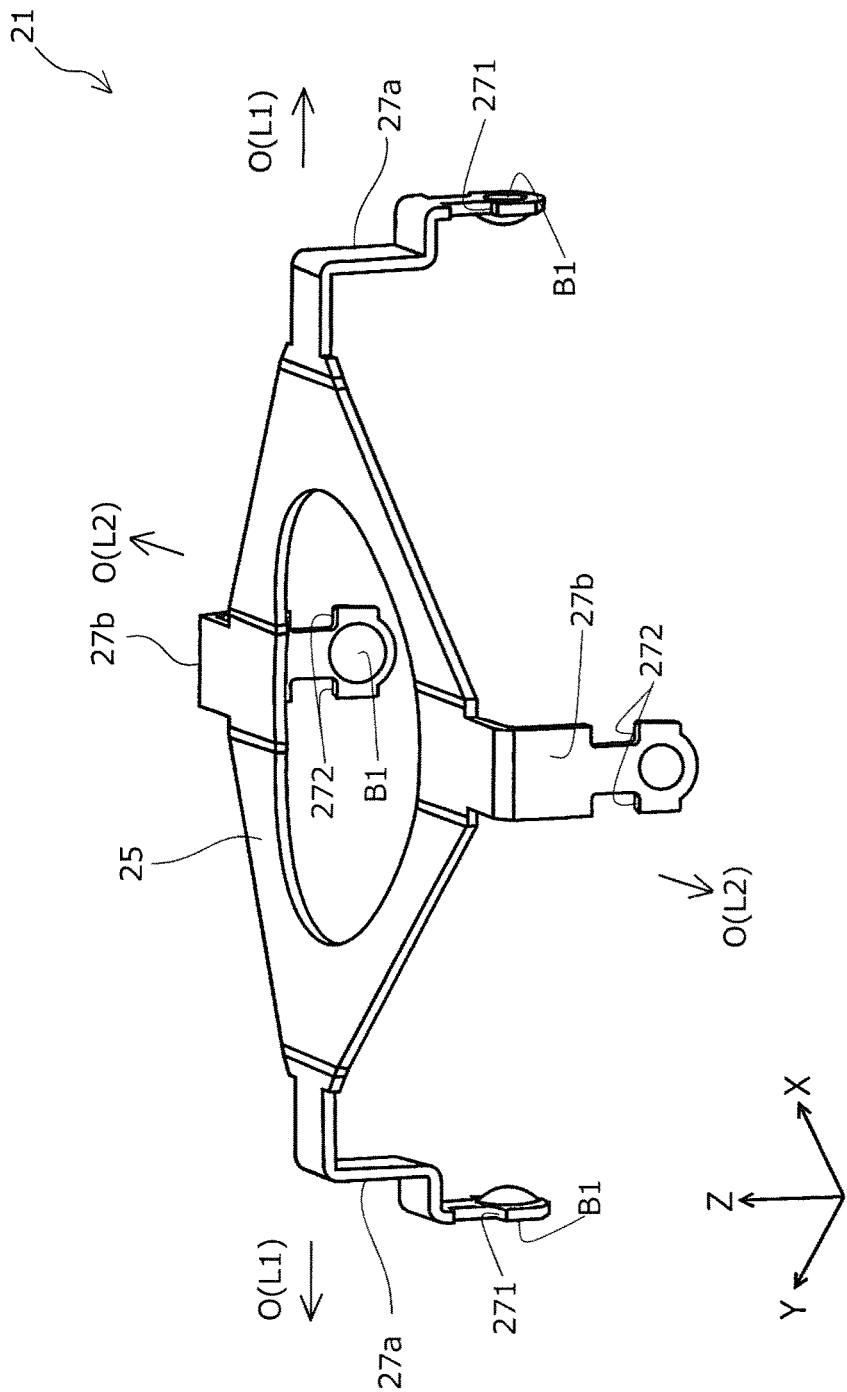
FIG. 5 is a perspective view showing a gimbal frame part of an optical unit in accordance with a first embodiment of the present invention.
Figure 6:
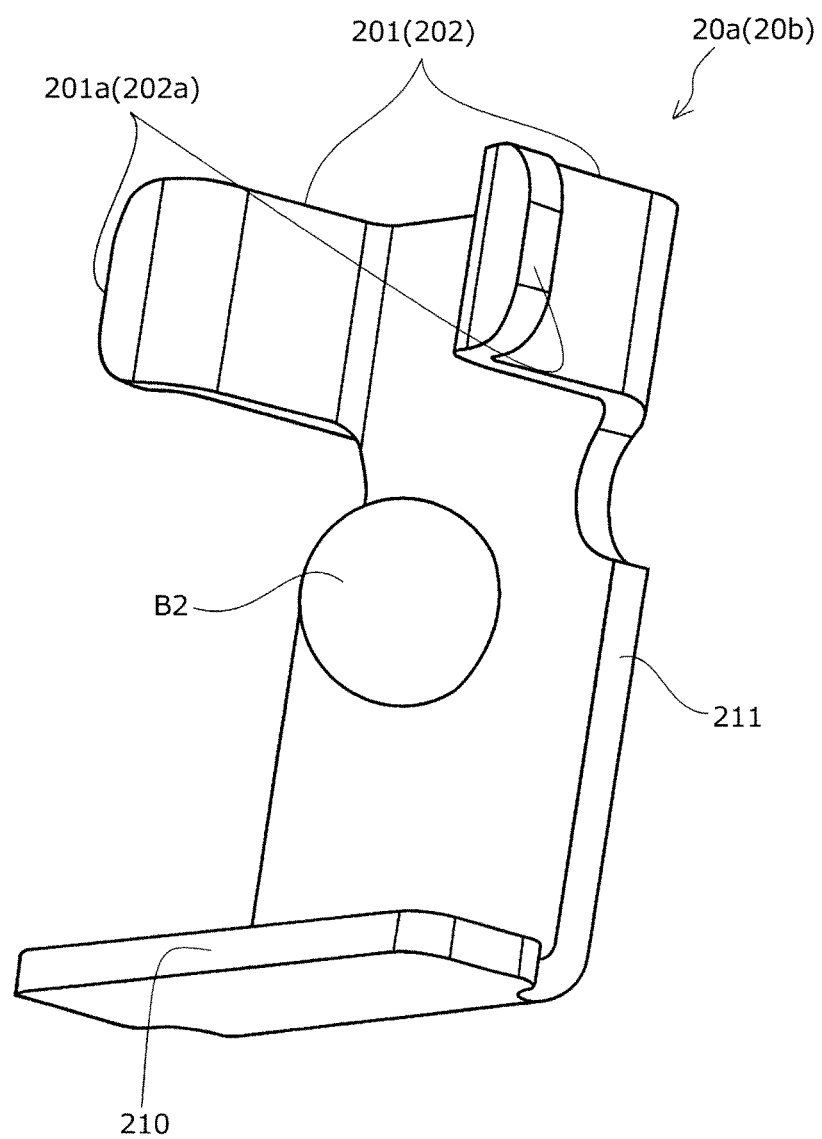
FIG. 6 is a perspective view showing a support mechanism of an optical unit in accordance with a first embodiment of the present invention.

The gimbal mechanism 21 is a mechanism having a spring property formed by bending a flat plate material made of metal. Specifically, as shown in FIG. 4 and FIG. 5, the gimbal mechanism 21 in this embodiment is provided with the gimbal frame part 25, and the gimbal frame part 25 is structured so as to provide with the two first support part extended parts 27a and the two second support part extended parts 27b which are formed by bending four corner parts of the gimbal frame part 25 by 90° to an opposite side to the object side in the optical axis direction. In other words, the gimbal frame part 25 in this embodiment is provided with the two first support part extended parts 27a extended along the optical axis direction and the two second support part extended parts 27b extended along the optical axis direction. In this case, the entire first support part extended part 27a and the entire second support part extended part 27b are not required to be formed in a plate shape, and only parts of the first support part extended part 27a and the second support part extended part 27b may be formed in a plate shape for obtaining a spring property. The gimbal mechanism 21 in this embodiment is structured as described above and thus, pressurization is capable of applying toward an outer side direction "O" (FIG. 4).

<Support Mechanism>

The support mechanism 20 turnably supports the movable body 14 with respect to the fixed body 16 with the first axial line "L1" and the second axial line "L2" as turning axes. As shown in FIG. 4, the support mechanism 20 includes the two first thrust receiving members 20a each of which supports the first support part extended part 27a and the two second thrust receiving members 20b each of which supports the second support part extended part 27b. The first thrust receiving member 20a is disposed at two facing positions of four corners of a rectangular frame-shaped portion of the side face cover part 28b of the fixed body 16, and the second thrust receiving member 20b is disposed at two facing positions of four corners of the holder frame 22 of the movable body 14 in the rectangular frame shape. In other words, the first thrust receiving members 20a are fixed to the fixed body 16 and the second thrust receiving members 20b are fixed to the movable body 14. In this embodiment, the rectangular frame-shaped portion of the side face cover part 28b and the movable body 14 in the rectangular frame shape are disposed so that the positions of their four corners are aligned, and the first thrust receiving member 20a and the second thrust receiving member 20b are disposed in four corners one by one.

<Support Structure of Gimbal Mechanism by Support Mechanism>

Figure 7:
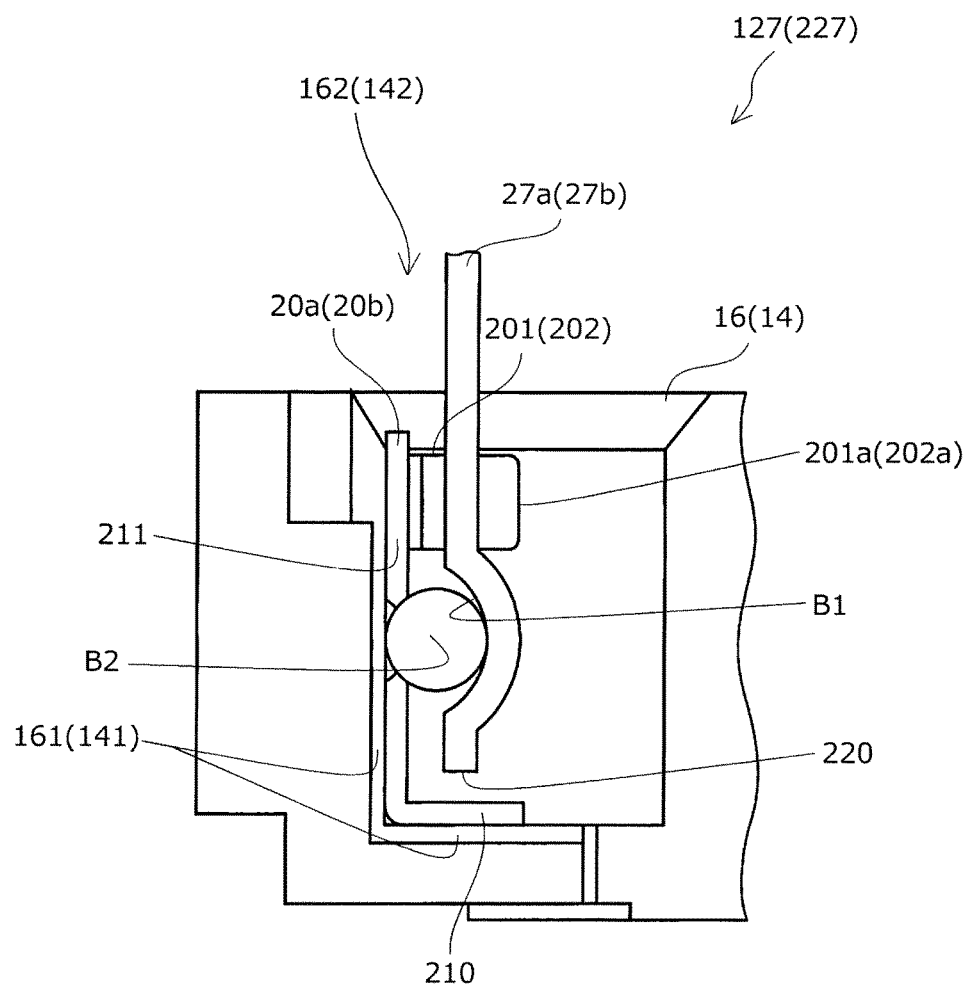
FIG. 7 is a cross-sectional side view showing parts of a gimbal frame part and a support mechanism and the like of an optical unit in accordance with a first embodiment of the present invention.
Figure 10:
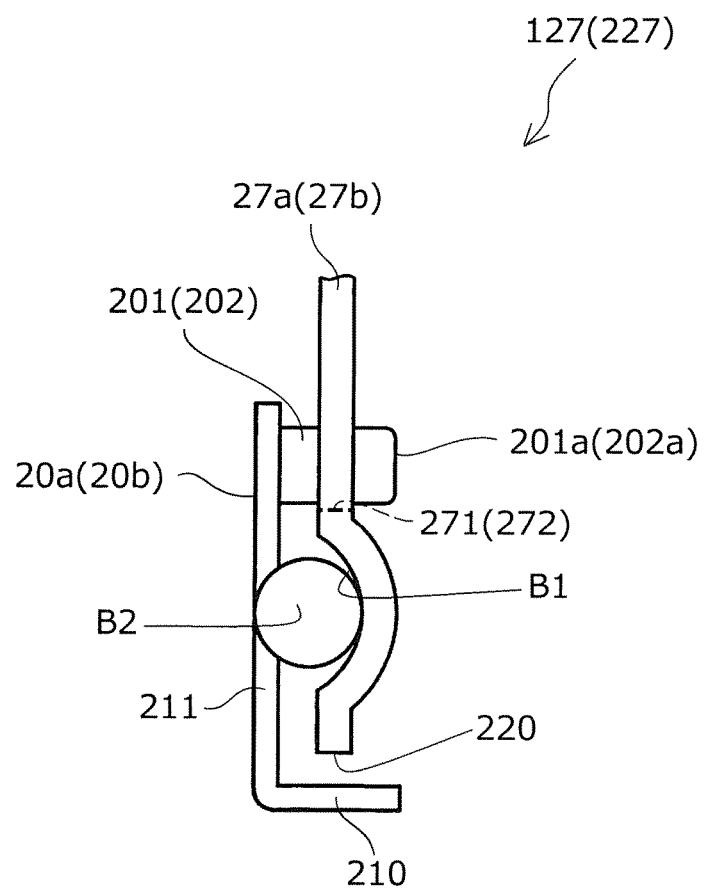
FIG. 10 is a cross-sectional side view showing parts of a gimbal frame part and a support mechanism of an optical unit in accordance with a first embodiment of the present invention.

As shown in FIG. 7 and FIG. 10 and the like, the first support part extended part 27a is provided with a spherical recessed surface "B1" and the first thrust receiving member 20a is provided with a spherical projecting surface "B2", and the spherical recessed surface "B1" and the spherical projecting surface "B2" are abutted with each other and thereby the first support part extended part 27a is supported by the first thrust receiving member 20a. The first support part extended part 27a and the second support part extended part 27b are similarly structured to each other, and the first thrust receiving member 20a and the second thrust receiving member 20b are similarly structured to each other. Therefore, the second support part extended part 27b is provided with a spherical recessed surface "B1" and the second thrust receiving member 20b is provided with a spherical projecting surface "B2" and, since the spherical recessed surface "B1" and the spherical projecting surface "B2" are abutted with each other, the second support part extended part 27b is supported by the second thrust receiving member 20b. Each of the two first support part extended parts 27a and each of the two second support part extended parts 27b are structured so as to apply pressurization to an outer side direction "O". Therefore, each of the spherical recessed surfaces "B1" presses each of the corresponding spherical projecting surfaces "B2" by using the pressurization, and the first support part extended parts 27a and the second support part extended parts 27b are respectively supported by the corresponding first thrust receiving member 20a and the corresponding second thrust receiving member 20b.

Figure 8:
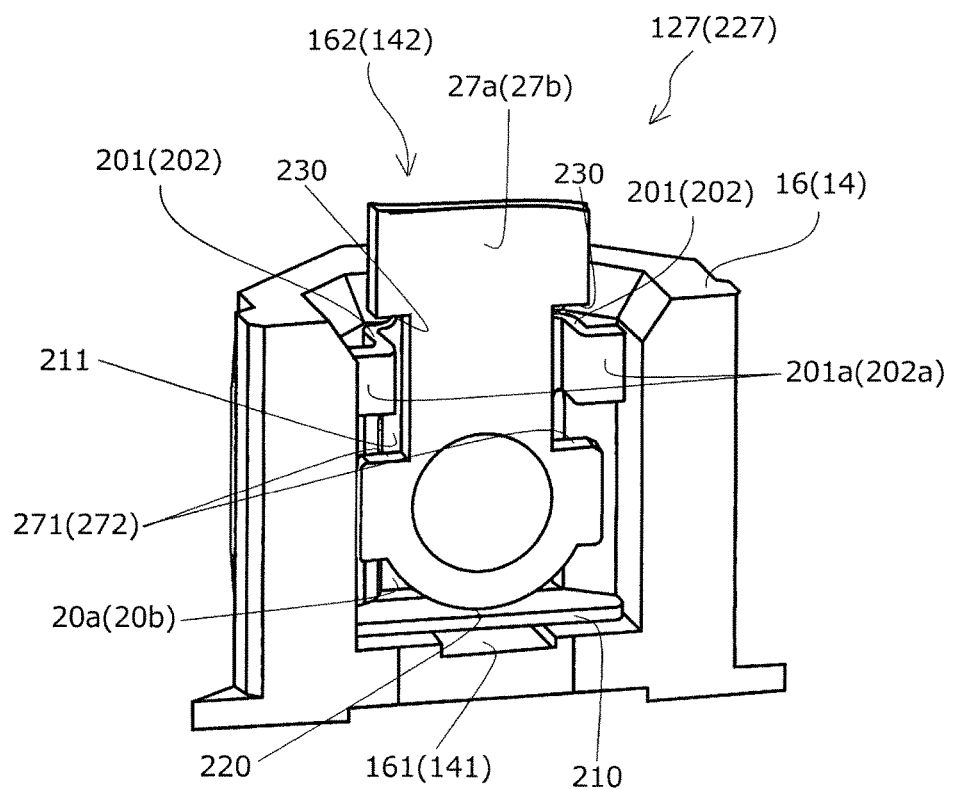
FIG. 8 is a perspective view showing parts of a gimbal frame part and a support mechanism and the like of an optical unit in accordance with a first embodiment of the present invention and is a view showing a state that the gimbal frame part is restricted in an inserting direction.
Figure 9:
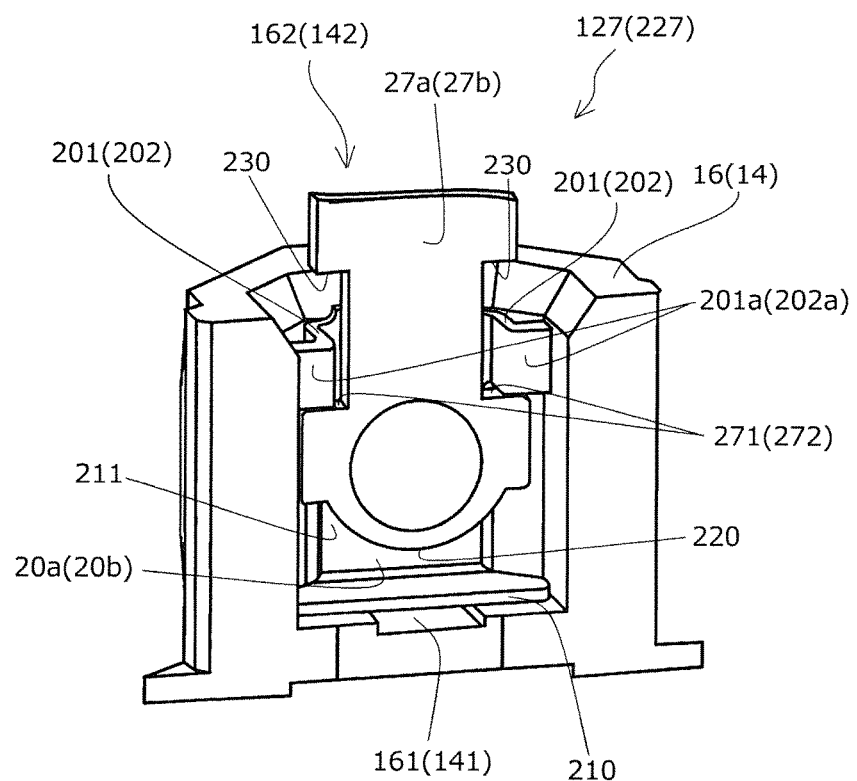
FIG. 9 is a perspective view showing parts of a gimbal frame part and a support mechanism and the like of an optical unit in accordance with a first embodiment of the present invention and is a view showing a state that the gimbal frame part is restricted in a direction opposite to the inserting direction.

As shown in FIG. 8 and FIG. 9, the first thrust receiving member 20a is formed with two first protruded parts 201 which are protruded toward the first support part extended part 27a. Further, as shown in FIG. 9, the first support part extended part 27a is formed with a first abutting part 271 which permits protrusion of the first protruded part 201 and abuts with the first protruded part 201 when the first support part extended part 27a is moved along the optical axis direction with respect to the first thrust receiving member 20a. The first support part extended part 27a and the second support part extended part 27b are similarly structured to each other, and the first thrust receiving member 20a and the second thrust receiving member 20b are similarly structured to each other. Therefore, the second thrust receiving member 20b is formed with two second protruded parts 202 which are protruded toward the second support part extended part 27b. Further, as shown in FIG. 9, the second support part extended part 27b is formed with a second abutting part 272 which permits protrusion of the second protruded part 202 and abuts with the second protruded part 202 when the second support part extended part 27b is moved along the optical axis direction with respect to the second thrust receiving member 20b. In other words, the optical unit 10 in this embodiment includes a first restriction mechanism 127 structured to restrict movement in the optical axis direction between the first support part extended part 27a and the first thrust receiving member 20a, and a second restriction mechanism 227 structured to restrict movement in the optical axis direction between the second support part extended part 27b and the second thrust receiving member 20b.

As shown in FIG. 6 through FIG. 10, the first thrust receiving member 20a and the second thrust receiving member 20b are formed in a substantially "L"-shape. In other words, the first thrust receiving member 20a and the second thrust receiving member 20b are respectively provided with a side plate part 211 to which pressurization is applied from the first support part extended part 27a and the second support part extended part 27b, and a base plate part 210 which is utilized as an abutting part for tip ends 220 of the first support part extended part 27a and the second support part extended part 27b as shown in FIG. 8. As shown in FIG. 8, the base plate part 210 serves to abut with the tip end 220 to restrict movement of the first support part extended part 27a and the second support part extended part 27b when the first support part extended part 27a and the second support part extended part 27b are moved to an opposite side to an object side along the optical axis direction with respect to the first thrust receiving member 20a and the second thrust receiving member 20b. In the first thrust receiving member 20a and the second thrust receiving member 20b, an adhesive is applied to a groove 161 formed in an "L"-shape in an inserted path 162 of the fixed body 16 and a groove 141 formed in an "L"-shape in an inserted path 142 of the movable body 14, and both of the side plate part 211 and the base plate part 210 are adhesively bonded and thereby the first thrust receiving member 20a and the second thrust receiving member 20b are firmly fixed to the fixed body 16 and the movable body 14.

In this embodiment, the first thrust receiving member 20a and the second thrust receiving member 20b are formed in an "L"-shape but they may be provided with no base plate part 210. Even in a case that the base plate part 210 is not provided, when the first support part extended part 27a and the second support part extended part 27b are moved to an opposite side to an object side along the optical axis direction with respect to the first thrust receiving member 20a and the second thrust receiving member 20b, the first protruded part 201 and the second protruded part 202 are abutted with wall parts 230 (see FIG. 8 and FIG. 9) of the first support part extended part 27a and the second support part extended part 27b to be capable of restricting movement of the first support part extended part 27a and the second support part extended part 27b.

As described above, the gimbal frame part 25 supported by the movable body 14 and the fixed body 16 through the support mechanism 20 is provided with the two first support part extended parts 27a extended along the optical axis direction and the two second support part extended parts 27b extended along the optical axis direction. Further, the support mechanism 20 includes the two first thrust receiving members 20a as a first support part which are fixed to the fixed body 16 and support the first support part extended parts 27a and the two second thrust receiving members 20b as a second support part which are fixed to the movable body 14 and support the second support part extended parts 27b. Further, the first protruded part 201 and the first abutting part 271, and the base plate part 210 of the first thrust receiving member 20a and the tip end 220 of the first support part extended part 27a structure a first restriction mechanism 127 structured to restrict movement in the optical axis direction of the first support part extended part 27a with respect to the first thrust receiving member 20a. Similarly, the second protruded part 202 and the second abutting part 272, and the base plate part 210 of the second thrust receiving member 20b and the tip end 220 of the second support part extended part 27b structure a second restriction mechanism 227 structured to restrict movement in the optical axis direction between the second support part extended part 27b and the second thrust receiving member 20b. Therefore, in the optical unit 10 in this embodiment, the gimbal frame part 25 can be effectively restrained from disengaging in the optical axis direction. Further, each of the two first support part extended parts 27a is supported with respect to the first thrust receiving member 20a by abutting the spherical projecting surface "B2" with the spherical recessed surface "B1" and, similarly, each of the two second support part extended parts 27b is supported with respect to the second thrust receiving member 20b by fitting the spherical projecting surface "B2" to the spherical recessed surface "B1". Since the spherical surfaces are contacted with each other as described above, in the optical unit 10 in this embodiment, the gimbal frame part 25 is restrained from disengaging also in a direction other than the optical axis direction.

Further, as described above, the respective two first support part extended parts 27a apply pressing forces to an outer side direction "O" (in other words, reverse directions along the first axial line "L1" which is the first direction intersecting the optical axis direction), and the respective two second support part extended parts 27b apply pressing forces to an outer side direction "O" (in other words, reverse directions along the second axial line "L2" which is the second direction intersecting the optical axis direction and the first direction). As described above, the respective first support part extended parts 27a and the respective second support part extended parts 27b are structured so as to mutually press to reverse directions. Therefore, a support point position is restrained from shaking and, even when a force is applied in any direction intersecting the optical axis direction, a repulsive force is generated and the spherical projecting surface "B2" and the spherical recessed surface "B1" are surely abutted with each other and thus, in the optical unit 10 in this embodiment, the gimbal frame part 25 is effectively restrained from disengaging in a direction intersecting the optical axis direction.

Further, as described above, in the optical unit 10 in this embodiment, both of the first thrust receiving member 20a and the second thrust receiving member 20b are formed in an "L"-shape. Therefore, the first thrust receiving member 20a and the second thrust receiving member 20b serve as restriction parts in a pushing direction of the gimbal frame part 25 and the gimbal frame part 25 is effectively restrained from disengaging. Further, the first thrust receiving member 20a and the second thrust receiving member 20b are formed in an "L"-shape and thus, contact areas with the fixed body 16 and the movable body 14 are increased and fixing strengths to the fixed body 16 and the movable body 14 are increased.

Further, as shown in FIG. 8 and FIG. 9, in the optical unit 10 in this embodiment, the fixed body 16 is provided with the inserted path 162 for the first thrust receiving member 20a, and the first thrust receiving member 20a is provided with the bent parts 201a which are bent so as to have a width corresponding to a width of the inserted path 162 for the first thrust receiving member 20a. Further, the movable body 14 is provided with the inserted path 142 for the second thrust receiving member 20b, and the second thrust receiving member 20b is provided with the bent parts 202a which are bent so as to have a width corresponding to a width of the inserted path 142 for the second thrust receiving member 20b. The optical unit 10 in this embodiment is structured as described above and thus, positioning accuracy of the first thrust receiving member 20a with respect to the fixed body 16 and positioning accuracy of the second thrust receiving member 20b with respect to the movable body 14 are enhanced.

In the optical unit 10 in this embodiment, the first support part extended part 27a and the second support part extended part 27b are structured of metal, and the first thrust receiving member 20a and the second thrust receiving member 20b are structured of metal or resin. As described above, it is preferable that, in the first support part extended part 27a and the first thrust receiving member 20a, the part 27a or the member 20a provided with the spherical projecting surface "B2" is structured of metal and, in the second support part extended part 27b and the second thrust receiving member 20b, the part 27b or the member 20b provided with the spherical projecting surface "B2" is structured of metal. When a side provided with the spherical projecting surface "B2" is structured of metal, for example, a metal spherical body can be welded to a plate-shaped part made of metal and thus, a structure provided with a spherical projecting surface "B2" can be easily formed with high strength. In this case, a structure provided with a spherical recessed surface "B1" may be formed of metal. However, when a structure provided with a spherical recessed surface "B1" is formed of resin, an optimum spherical recessed surface "B1" can be easily formed and slidability for the spherical projecting surface "B2", i.e., movability of the movable body 14 can be enhanced. In accordance with an embodiment of the present invention, it is not limited that a side provided with the spherical projecting surface "B2" is formed of metal, and it is not limited that a side provided with the spherical recessed surface "B1" is formed of resin.

As shown in FIG. 8 and FIG. 9, in the optical unit 10 in this embodiment, it is structured that the first thrust receiving member 20a is provided with a plurality of the first protruded parts 201 so as to sandwich the first support part extended part 27a, and that the second thrust receiving member 20b is provided with a plurality of the second protruded parts 202 so as to sandwich the second support part extended part 27b. The first support part extended part 27a is sandwiched by the first protruded parts 201 and the second support part extended part 27b is sandwiched by the second protruded parts 202 and thus, the gimbal frame part 25 is sandwiched from both sides between a plurality of the protruded parts, and the gimbal frame part 25 can be effectively restrained from disengaging in a direction intersecting the optical axis direction.

Further, in the optical unit 10 in this embodiment, the spherical recessed surface "B1" is formed in the first support part extended part 27a and the spherical projecting surface "B2" is formed in the first thrust receiving member 20a, and the spherical recessed surface "B1" is formed in the second support part extended part 27b and the spherical projecting surface "B2" is formed in the second thrust receiving member 20b. According to this structure, the optical unit 10 is easily manufactured.

Figure 11:
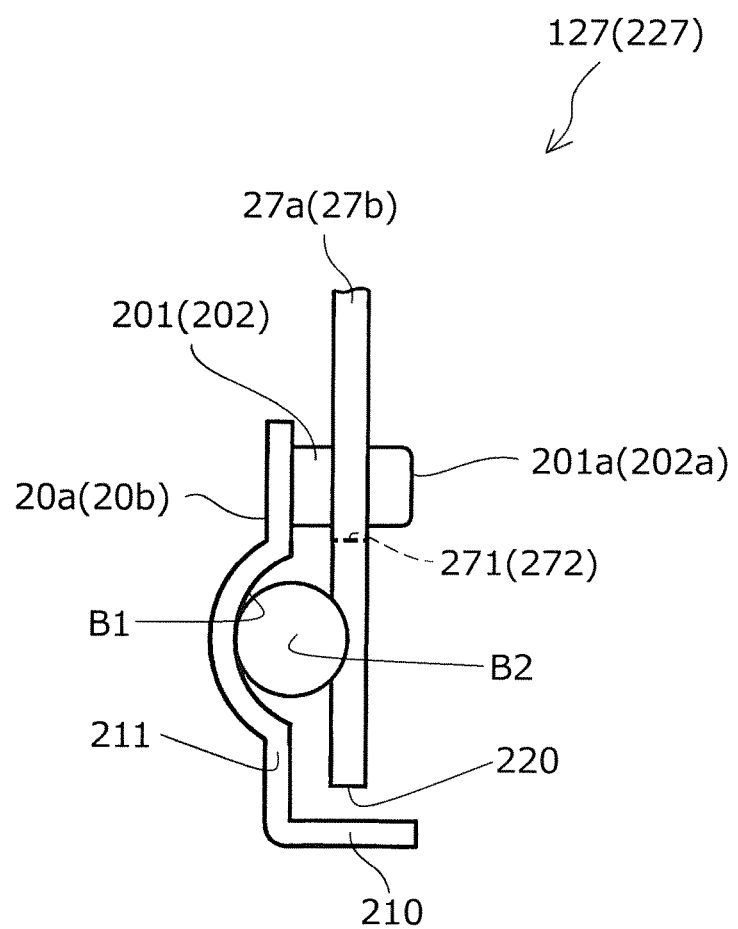
FIG. 11 is a cross-sectional side view showing parts of a gimbal frame part and a support mechanism of an optical unit in accordance with a second embodiment of the present invention.

[Second Embodiment] (FIG. 11)

Next, an optical unit 10 in accordance with a second embodiment will be described below with reference to FIG. 11. FIG. 11 is a cross-sectional side view showing parts of a gimbal frame part 25 and a support mechanism 20 of an optical unit 10 in accordance with a second embodiment and is a view corresponding to FIG. 10 in the optical unit 10 in the first embodiment. Structure members common to the first embodiment are indicated with the same reference signs and their detailed descriptions are omitted. The optical unit 10 in the second embodiment has the same structure as the optical unit 10 in the first embodiment except a support structure for a gimbal mechanism 21 in a support mechanism 20.

In the optical unit 10 in the first embodiment, the spherical recessed surface "B1" is formed in the first support part extended part 27a and the second support part extended part 27b, and the spherical projecting surface "B2" is formed in the first thrust receiving member 20a and the second thrust receiving member 20b. On the other hand, in the optical unit 10 in the second embodiment, as shown in FIG. 11, a spherical projecting surface "B2" is formed in the first support part extended part 27a and the second support part extended part 27b and a spherical recessed surface "B1" is formed in the first thrust receiving member 20a and the second thrust receiving member 20b.

Further, both of the optical unit 10 in the first embodiment and the optical unit 10 in the second embodiment include the first restriction mechanism 127 which includes the first protruded part 201 provided in the first thrust receiving member 20a and protruded toward the first support part extended part 27a, and the first abutting part 271 which is provided in the first support part extended part 27a and permits protrusion of the first protruded part 201 and, when the first support part extended part 27a is moved with respect to the first thrust receiving member 20a along the optical axis direction, the first abutting part 271 is abutted with the first protruded part 201. Further, the second restriction mechanism 227 is provided which includes the second protruded part 202 provided in the second thrust receiving member 20b and protruded toward the second support part extended part 27b, and the second abutting part 271 which is provided in the second support part extended part 27b and permits protrusion of the second protruded part 202 and, when the second support part extended part 27b is moved with respect to the second thrust receiving member 20b along the optical axis direction, the second abutting part 272 is abutted with the second protruded part 202. As described above, the first thrust receiving member 20a and the second thrust receiving member 20b are provided with the protruded parts and the first support part extended part 27a and the second support part extended part 27b are provided with the abutting parts structured to abut with the protruded parts. As a result, the optical unit 10 can be easily manufactured.

Figure 12:
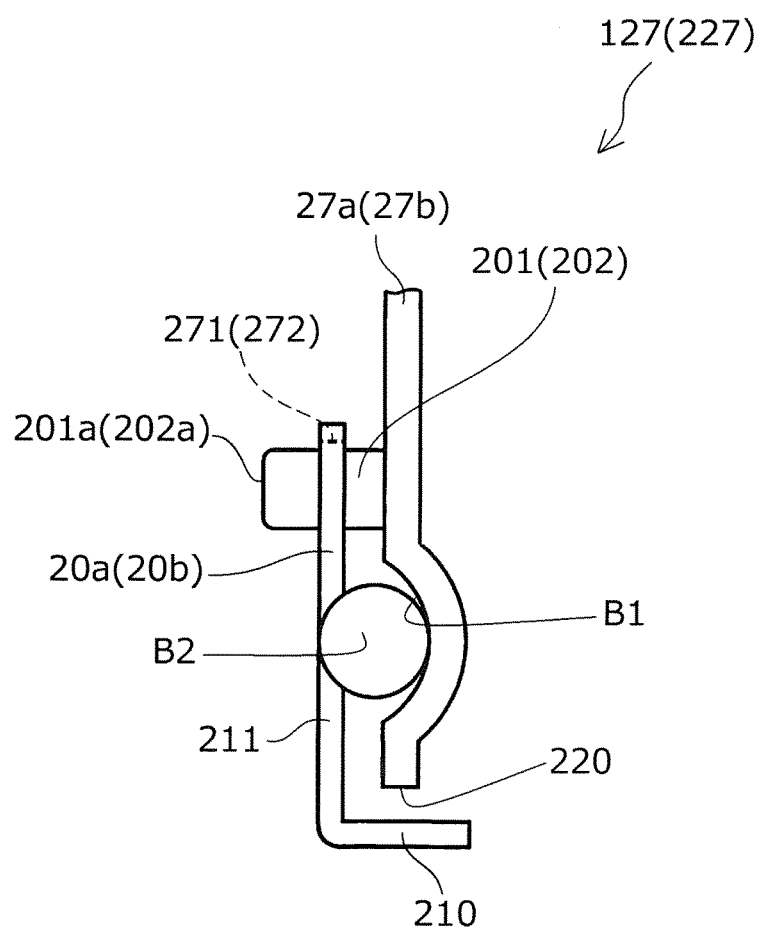
FIG. 12 is a cross-sectional side view showing parts of a gimbal frame part and a support mechanism of an optical unit in accordance with a third embodiment of the present invention.

[Third Embodiment] (FIG. 12)

Next, an optical unit 10 in accordance with a third embodiment will be described below with reference to FIG. 12. FIG. 12 is a cross-sectional side view showing parts of a gimbal frame part 25 and a support mechanism 20 of an optical unit 10 in accordance with a third embodiment and is a view corresponding to FIG. 10 in the optical unit 10 in the first embodiment. Structure members common to the first embodiment are indicated with the same reference signs and their detailed descriptions are omitted. The optical unit 10 in the third embodiment has the same structure as the optical units 10 in the first embodiment and the second embodiment except a support structure for a gimbal mechanism 21 in a support mechanism 20.

In the optical units 10 in the first embodiment and the second embodiment, the first thrust receiving member 20a and the second thrust receiving member 20b are provided with the first protruded part 201 and the second protruded part 202, and the first support part extended part 27a and the second support part extended part 27b are provided with the first abutting part 271 and the second abutting part 272 structured to abut with the first protruded part 201 and the second protruded part 202. On the other hand, in the optical unit 10 in the third embodiment, as shown in FIG. 12, the first thrust receiving member 20a and the second thrust receiving member 20b are provided with a first abutting part 271 and a second abutting part 272, and the first support part extended part 27a and the second support part extended part 27b are provided with a first protruded part 201 and a second protruded part 202. Further, in the optical unit 10 in the third embodiment, as shown in FIG. 12, similarly to the optical unit 10 in the first embodiment, the first support part extended part 27a and the second support part extended part 27b are formed with a spherical recessed surface "B1" and the first thrust receiving member 20a and the second thrust receiving member 20b are formed with a spherical projecting surface "B2".

Figure 13:
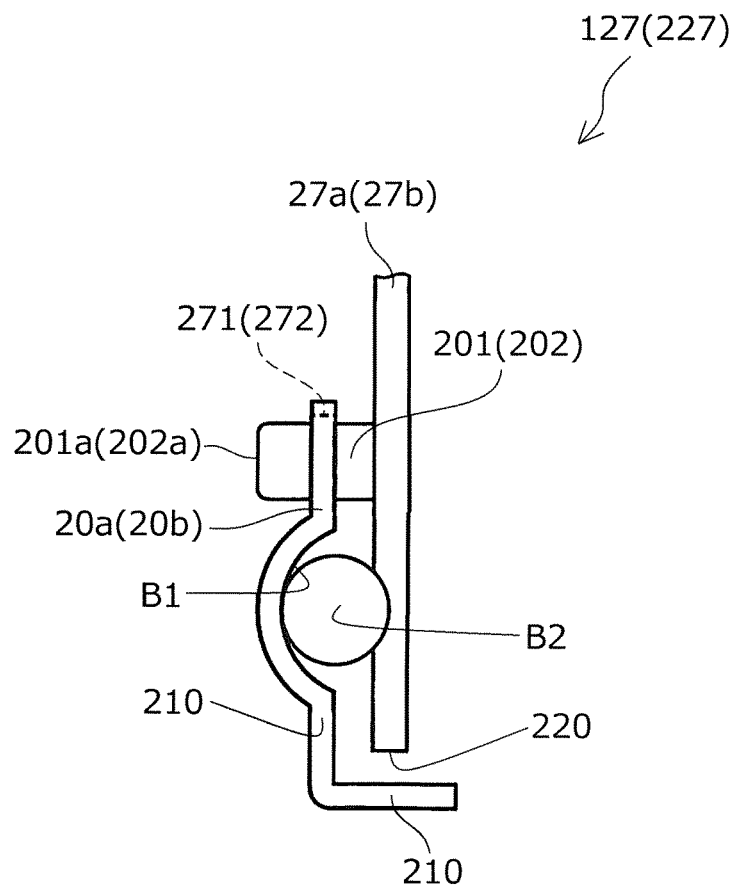
FIG. 13 is a cross-sectional side view showing parts of a gimbal frame part and a support mechanism of an optical unit in accordance with a fourth embodiment of the present invention.

[Fourth Embodiment] (FIG. 13)

Next, an optical unit 10 in accordance with a fourth embodiment will be described below with reference to FIG. 13. FIG. 13 is a cross-sectional side view showing parts of a gimbal frame part 25 and a support mechanism 20 of an optical unit in accordance with a fourth embodiment and is a view corresponding to FIG. 10 in the optical unit 10 in the first embodiment. Structure members common to the first embodiment through the third embodiment are indicated with the same reference signs and their detailed descriptions are omitted. The optical unit 10 in the fourth embodiment has the same structure as the optical units 10 in the first embodiment through the third embodiment except a support structure for a gimbal mechanism 21 in a support mechanism 20.

In the optical unit 10 in the fourth embodiment, as shown in FIG. 13, similarly to the optical unit 10 in the third embodiment, the first thrust receiving member 20a and the second thrust receiving member 20b are provided with a first abutting part 271 and a second abutting part 272, and the first support part extended part 27a and the second support part extended part 27b are provided with a first protruded part 201 and a second protruded part 202. Further, in the optical unit 10 in the fourth embodiment, as shown in FIG. 13, similarly to the optical unit 10 in the second embodiment, the first support part extended part 27a and the second support part extended part 27b are formed with a spherical projecting surface "B2" and the first thrust receiving member 20a and the second thrust receiving member 20b are formed with a spherical recessed surface "B1".

Figure 14:
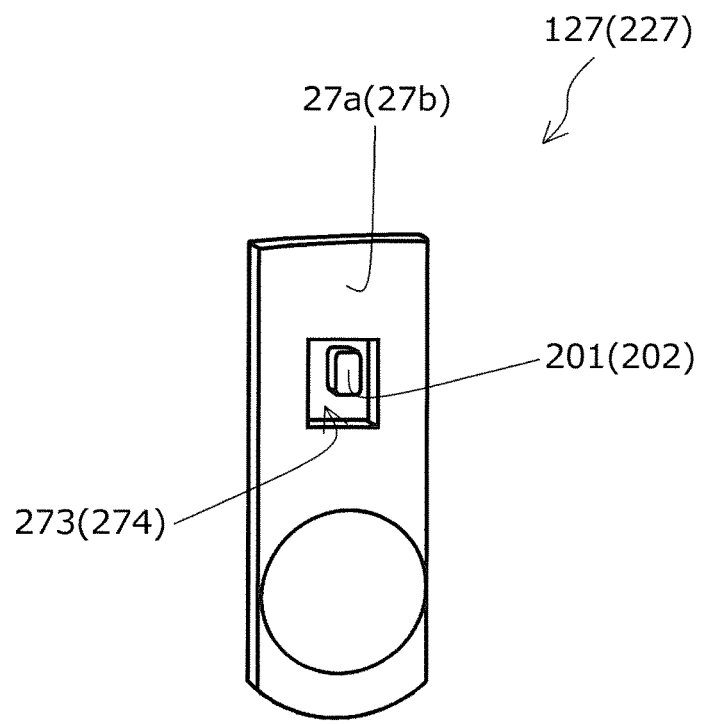
FIG. 14 is a front view showing parts of a gimbal frame part and a support mechanism of an optical unit in accordance with a fifth embodiment of the present invention.

[Fifth Embodiment] (FIG. 14)

Next, an optical unit 10 in accordance with a fifth embodiment will be described below with reference to FIG. 14. FIG. 14 is a front view showing parts of a gimbal frame part 25 and a support mechanism 20 of an optical unit 10 in accordance with a fifth embodiment of the present invention. Structure members common to the first embodiment through the fourth embodiment are indicated with the same reference signs and their detailed descriptions are omitted. The optical unit 10 in the fifth embodiment has the same structure as the optical units 10 in the first embodiment through the fourth embodiment except a support structure for a gimbal mechanism 21 in a support mechanism 20.

In the optical unit 10 in the fifth embodiment, the first support part extended part 27a is provided with a first hole part 273 which permits protrusion of a first protruded part 201 and the second support part extended part 27b is provided with a second hole part 274 which permits protrusion of a second protruded part 202. The first protruded part 201 and the first hole part 273 structure a first restriction mechanism 127, and the second protruded part 202 and the second hole part 274 structure a second restriction mechanism 227. According to this structure, in comparison with a structure that the first support part extended part 27a and the second support part extended part 27b are sandwiched by protruded parts from both sides, the first support part extended part 27a and the second support part extended part 27b can be formed thin and thus, the size of the device (optical unit 10) can be reduced.

Although the present invention has been shown and described with reference to a specific embodiment, various changes and modifications will be apparent to those skilled in the art from the teachings herein.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:
1. An optical unit comprising:
a movable body comprising an optical module;
a fixed body;
a support mechanism which movably supports the movable body with respect to the fixed body; and
a gimbal mechanism comprising a gimbal frame part which supports the movable body through the support mechanism between the movable body and the fixed body;
wherein the gimbal frame part comprises a first support part extended part which is extended along an optical axis direction and a second support part extended part which is extended along the optical axis direction;
wherein the support mechanism comprises a first support part which is fixed to the fixed body and supports the first support part extended part, and a second support part which is fixed to the movable body and supports the second support part extended part;
wherein the first support part extended part is supported with respect to the first support part by fitting a spherical projecting surface to a spherical recessed surface;
wherein the second support part extended part is supported with respect to the second support part by fitting a spherical projecting surface to a spherical recessed surface; and
wherein the optical unit further comprising:

a first restriction mechanism structured to restrict movement in the optical axis direction between the first support part extended part and the first support part; and a second restriction mechanism structured to restrict movement in the optical axis direction between the second support part extended part and the second support part.

2. The optical unit according to claim 1, wherein the first support part extended part comprises two first support part extended parts, the two first support part extended parts respectively apply pressing forces to reverse directions along a first direction intersecting the optical axis direction, the second support part extended part comprises two second support part extended parts, and the two second support part extended parts respectively apply pressing forces to reverse directions along a second direction intersecting the optical axis direction and the first direction.

3. The optical unit according to claim 1, wherein the first support part extended part is formed with a spherical recessed surface and the first support part is formed with a spherical projecting surface, and the second support part extended part is formed with a spherical recessed surface and the second support part is formed with a spherical projecting surface.

4. The optical unit according to claim 1, wherein the first restriction mechanism comprises:
- a first protruded part which is provided in the first support part and is protruded toward the first support part extended part; and
- a first abutting part which is provided in the first support part extended part and permits protrusion of the first protruded part, and the first abutting part being structured to be abutted with the first protruded part when the first support part extended part is moved with respect to the first support part along the optical axis direction, and the second restriction mechanism comprises:
- a second protruded part which is provided in the second support part and is protruded toward the second support part extended part; and
- a second abutting part which is provided in the second support part extended part and permits protrusion of the second protruded part, and the second abutting part being structured to be abutted with the second protruded part when the second support part extended part is moved with respect to the second support part along the optical axis direction.

5. The optical unit according to claim 4, wherein the first support part comprises a plurality of the first protruded parts so as to sandwich the first support part extended part, and the second support part comprises a plurality of the second protruded parts so as to sandwich the second support part extended part.

6. The optical unit according to claim 4, wherein the first support part extended part comprises a first hole part which permits protrusion of the first protruded part, and the second support part extended part comprises a second hole part which permits protrusion of the second protruded part.

7. The optical unit according to claim 1, wherein the first support part is formed in an "L"-shape, and the second support part is formed in an "L"-shape.

8. The optical unit according to claim 1, wherein the fixed body comprises an inserted path for the first support part, the first support part comprises a bent part which is bent so as to have a width corresponding to a width of the inserted path for the first support part, the movable body comprises an inserted path for the second support part, and the second support part comprises a bent part which is bent so as to have a width corresponding to a width of the inserted path for the second support part.

9. The optical unit according to claim 1, wherein one of the first support part extended part and the first support part which comprises the spherical projecting surface is made of metal, and one of the second support part extended part and the second support part which comprises the spherical projecting surface is made of metal.

* * * * *